United States Patent [19]
Szlam et al.

[11] Patent Number: 5,214,688
[45] Date of Patent: May 25, 1993

[54] METHOD AND APPARATUS FOR DYNAMIC AND INTERDEPENDENT PROCESSING OF INBOUND CALLS AND OUTBOUND CALLS

[75] Inventors: Aleksander Szlam, Norcross; James W. Crooks, Jr.; Dean H. Harris, both of Marietta, all of Ga.

[73] Assignee: Inventions, Inc., Norcross, Ga.

[21] Appl. No.: 533,489

[22] Filed: Jun. 5, 1990

[51] Int. Cl.[5] .............................................. H04M 1/64
[52] U.S. Cl. ...................................... 379/67; 379/88; 379/112; 379/137
[58] Field of Search ..................... 379/67, 69, 84, 88, 379/112, 113, 212, 213, 214, 218, 265, 266, 302, 303, 137, 139, 89

[56] References Cited

U.S. PATENT DOCUMENTS

| | | | |
|---|---|---|---|
| 4,199,665 | 4/1980 | Emrick et al. | 379/137 |
| 4,694,483 | 9/1987 | Cheung | 379/265 |
| 4,757,267 | 7/1988 | Riskin | 379/88 |
| 4,792,968 | 12/1988 | Katz | 379/67 |
| 4,797,911 | 1/1989 | Szlam et al. | 379/216 |
| 4,829,563 | 5/1989 | Crockett et al. | 379/309 |
| 4,878,240 | 10/1989 | Lin et al. | 379/67 |
| 4,881,261 | 11/1989 | Oliphant et al. | 379/265 |
| 4,894,857 | 1/1990 | Szlam et al. | 379/216 |
| 4,939,771 | 7/1990 | Brown et al. | 379/214 |
| 4,939,773 | 7/1990 | Katz | 379/204 |
| 5,062,103 | 10/1991 | Davidson et al. | 379/265 |

Primary Examiner—Jin F. Ng
Assistant Examiner—Huyen D. Le
Attorney, Agent, or Firm—Jones & Askew

[57] ABSTRACT

A method for optimizing the pacing and processing of inbound calls and outbound calls. Statistics are generated concerning inbound calls and outbound calls, and concerning the performance of each agent for inbound calls and outbound calls. Separate statistics concerning inbound calls and outbound calls allow a more accurate prediction of call pacing and handling requirements and of the availability of an agent so as to maximize the productivity of each agent and control the on-hold time of inbound and outbound calls. Each trunk line is designated for inbound calls or outbound calls and the status of each trunk is monitored. If all of the trunks allocated to inbound service are in use then some of the trunks designated for outbound service are redesignated for inbound service. If more than a predetermined number of trunks designated for inbound service are not in use then some of these trunks will be redesignated for outbound service. Therefore, the rate of answering of inbound calls and the rate of placement of outbound calls, and the allocation of trunks between inbound calls and outbound calls are driven by the frequency, duration and number of calls and user-selectable options.

73 Claims, 8 Drawing Sheets

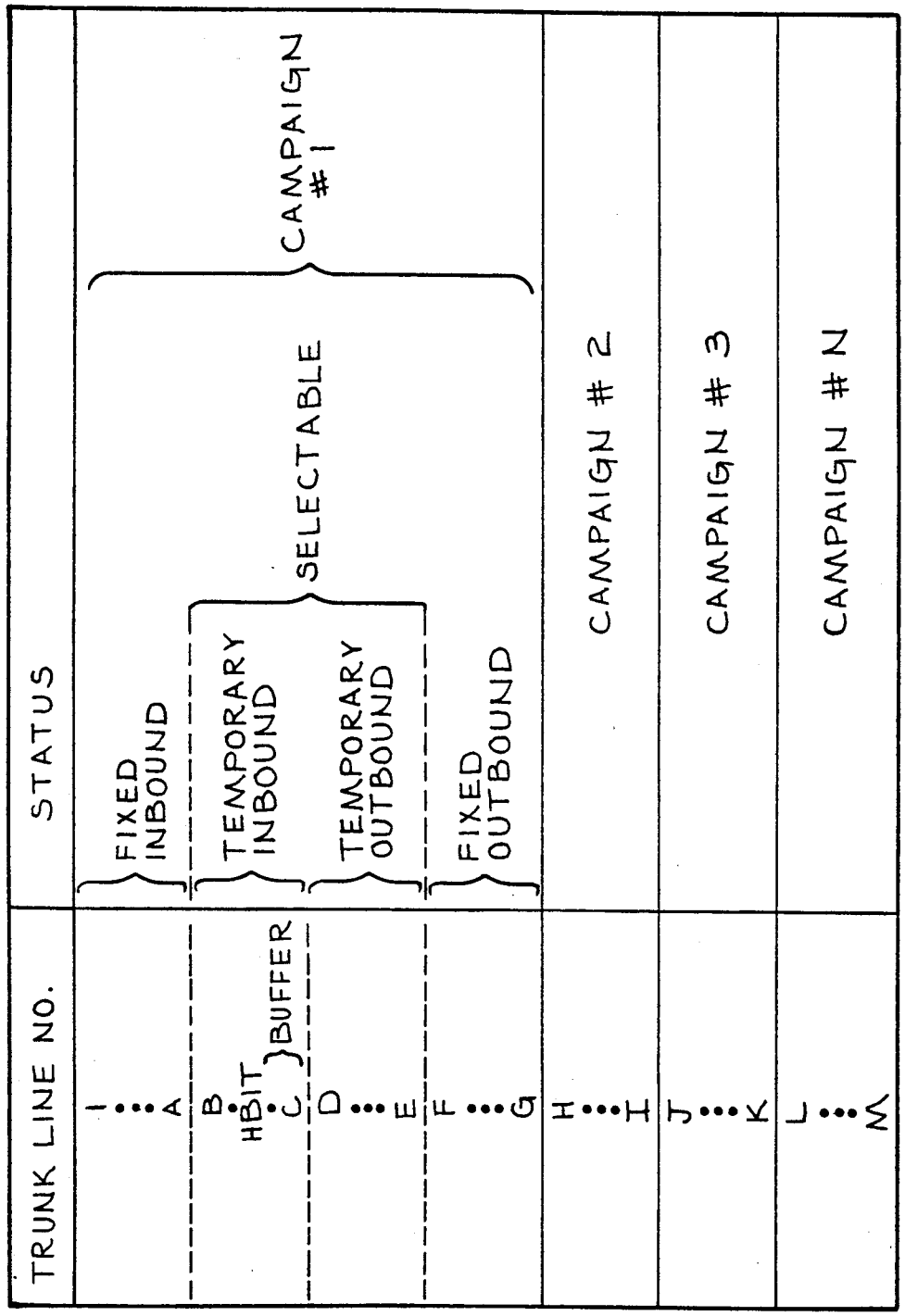

METHOD AND APPARATUS FOR DYNAMIC AND INTERDEPENDENT PROCESSING OF INBOUND CALLS AND OUTBOUND CALLS

TECHNICAL FIELD

The present invention relates to automated telephone call processing systems and, more particularly, describes a method for dynamically allocating inbound trunks and outbound trunks in response to the volume of inbound and outbound calls, described a method for adjusting outbound call pacing and processing in response to the volume of inbound calls, described a method for processing inbound calls in response to the volume of outbound calls, and also describes a method for more accurately predicting the availability of an agent.

BACKGROUND OF THE INVENTION

Automated telephone call processing systems, such as collection systems and marketing systems, should accommodate both inbound and outbound telephone calls. For outbound calls, the system seizes an available trunk line, dials the telephone number of the customer or potential customer, monitors the trunk line for an indication that the called party has answered the outbound call and, if a called party answers, connects the outbound call to a currently available agent or places the outbound call in a queue for eventual connection to a later available agent. The rate of placement of outbound calls is completely under the control of the call processing system and is determined by a pacing algorithm which typically uses one or more of the following statistics: the number of agents on duty, the number of agents available, the ring time of an outbound call before it is answered (the "set up" time), the historical probability that a call will be answered (the "hit rate"), the number of calls placed and/or answered and/or waiting and/or on-hold, the time that a called party is on-hold waiting for an available agent, the time that a called party is connected to an agent, the time and/or day of the call, etc. U.S. Pat. Nos. 4,829,563 and 4,881,261 disclose two predictive dialing methods.

Pacing algorithms are intended to maximize agent efficiency by reducing the time that the agent is idle between calls. Ideally, a called party will answer an outbound call just as an agent is completing an earlier-initiated transaction. However, variations in individual calls can result in agents being underutilized, such as waiting for an outbound call to be answered, or being over utilized, so that a called party must wait for an agent to become available. Because a called party typically has a low tolerance for being placed on-hold, the pacing algorithms are typically biased so that a called party is not placed on-hold or is placed on-hold for less than a predetermined time. Of course, this sometimes means that the agents will be underutilized.

Inbound calls present a different type of problem. The rate of occurrence of inbound calls is random and is not under the control of the call processing system. Typically, statistics will be gathered and a minimum number of agents for handling inbound calls will be identified. This minimum number of agents is selected so that the idle time is minimal and the on-hold time for a calling party is typically less than some predetermined acceptable value. A calling party will generally tolerate a longer on-hold time than a called party.

If too few agents are used then the duration of the on-hold time will frequently exceed the tolerance of the calling party, which can lead to dissatisfied or lost customers. If too many agents are used then the idle time of the agents will increase, the efficiency of the agents will drop, and the cost of doing business will increase.

Statistics can be gathered on inbound calls and predictions made as to the number of agents required for handling inbound calls at any designated time and/or day. However, the mechanics of staffing and training for the agents may present problems, especially for part-time and/or off-hour duty positions to handle peak loads.

Therefore, there is a need for a method and a telephone call processing apparatus which accommodate both inbound calls and outbound calls and respond to the total inbound and outbound call volume by adjusting the pacing of outbound calls and/or the pacing (answering and connection) of inbound calls so as to minimize the idle time of all agents and the on-hold time of called and calling parties and to maximize the utility of the telephone trunk line.

Furthermore, the nature of inbound calls is generally different from the nature of outbound calls so the duration of the calls is different. Therefore, there is a need for call pacing algorithms responsive to whether an individual agent is handling an inbound call or an outbound call.

In addition, if a system accommodates both inbound calls and outbound calls then the system must separate the trunks into inbound trunks and outbound trunks so that inbound calls do not occur on outbound trunks and vice versa.

SUMMARY OF THE INVENTION

The present invention is a method for operating an automated telephone call processing system so as to minimize the idle time of agents and the on-hold time of both called and calling parties and so as to maximize the utilization of the available telephone trunks.

The present invention adjusts the pacing of the outbound calls in response to the volume of the inbound calls and the outbound calls. As the inbound calls increase in frequency and/or duration more agents and/or trunks are allocated to accommodate the inbound calls so the pacing of the outbound calls is decreased. All the agents are therefore kept busy handling inbound and/or outbound calls. This also keeps the on-hold time of inbound calls and answered outbound calls within acceptable limits.

More particularly, a group of trunk lines is partitioned into inbound only, selectable, and outbound only trunks. The selectable trunks may be further partitioned into temporary inbound trunks and temporary outbound trunks. Separate statistics are maintained for inbound and outbound calls. When inbound calls increase in frequency and/or duration more agents and more trunks are required to handle the inbound calls. Therefore, more of the selectable trunks are classified as temporary inbound trunks and the pacing algorithm for the outbound calls is adjusted so as to reduce the rate of placement of outbound calls. This reduces the number of agents necessary to handle the outbound calls and thereby increases the number of agents available to handle the inbound calls.

When inbound calls decrease in frequency and/or duration fewer agents and fewer trunks are required to handle the inbound calls. Therefore, more of the selectable trunks are classified as temporary outbound trunks and the pacing algorithm for the outbound calls is adjusted so as to increase the rate of placement of outbound calls. This increases the number of agents needed to handle the outbound calls.

The present invention also provides for the case that outbound calls have a higher priority. Inbound calls will not be answered, or will be allowed to ring for a longer time, or will be placed on-hold for a predetermined time, or otherwise handled in a manner which treats inbound calls as lower priority calls.

The present invention also protects against inbound-/outbound trunk usage problems, such as glare, by providing a window or buffer between the trunks designated for inbound duty and the trunks designated for outbound duty. This window allows for increases in the number of inbound calls while still preserving the integrity of the outbound trunks. The window may be fixed or dynamic, and if dynamic may be linear or non-linear. The window minizes the likelihood of glare while maximizing the overall trunk usage.

The present invention determines the allocation of trunks for inbound duty and outbound duty by monitoring the degree of usage of trunks designated for inbound duty. If the degree of usage is high more trunks will be designated as inbound trunks, whereas if the degree of usage is low then fewer trunks will be designated as inbound trunks.

The present invention is also a method for improving the accuracy of prediction of the availability of an agent. The present invention maintains separate statistics for each agent and for each agent's handling of inbound calls and of outbound calls. The availability of an individual agent is then based upon whether that agent is handling an inbound call or an outbound call.

Therefore, it is an object of the present invention to dynamically reallocate trunks and agents, as needed, between handling inbound calls and handling outbound calls so as to minimize the idle time of the agents and the on-hold time of the called and calling parties.

It is another object of the present invention to maximize the degree of usage of the available trunk lines.

It is another object of the present invention to adjust the call pacing algorithm for outbound calls in response to the frequency and/or duration of inbound calls.

It is another object of the present invention to automatically obtain information from the calling party, obtain the customer account data for that party, and place that account in a queue for callback when an agent becomes available.

It is another object of the present invention to predict the availability of an agent and adjust the pacing of outbound calls and/or inbound calls based upon whether the agent is handling an inbound call or an outbound call.

It is another object of the present invention to adjust the call handling algorithm for inbound calls in response to the frequency and/or duration of outbound calls, in response to the weighting given inbound calls with respect to outbound calls, and in response to the on-hold time of inbound calls.

BRIEF DESCRIPTION OF THE DRAWINGS

FIG. 2 is an illustration of the allocation of the trunk lines between inbound and outbound calling status.

DETAILED DESCRIPTION

Figure 1:
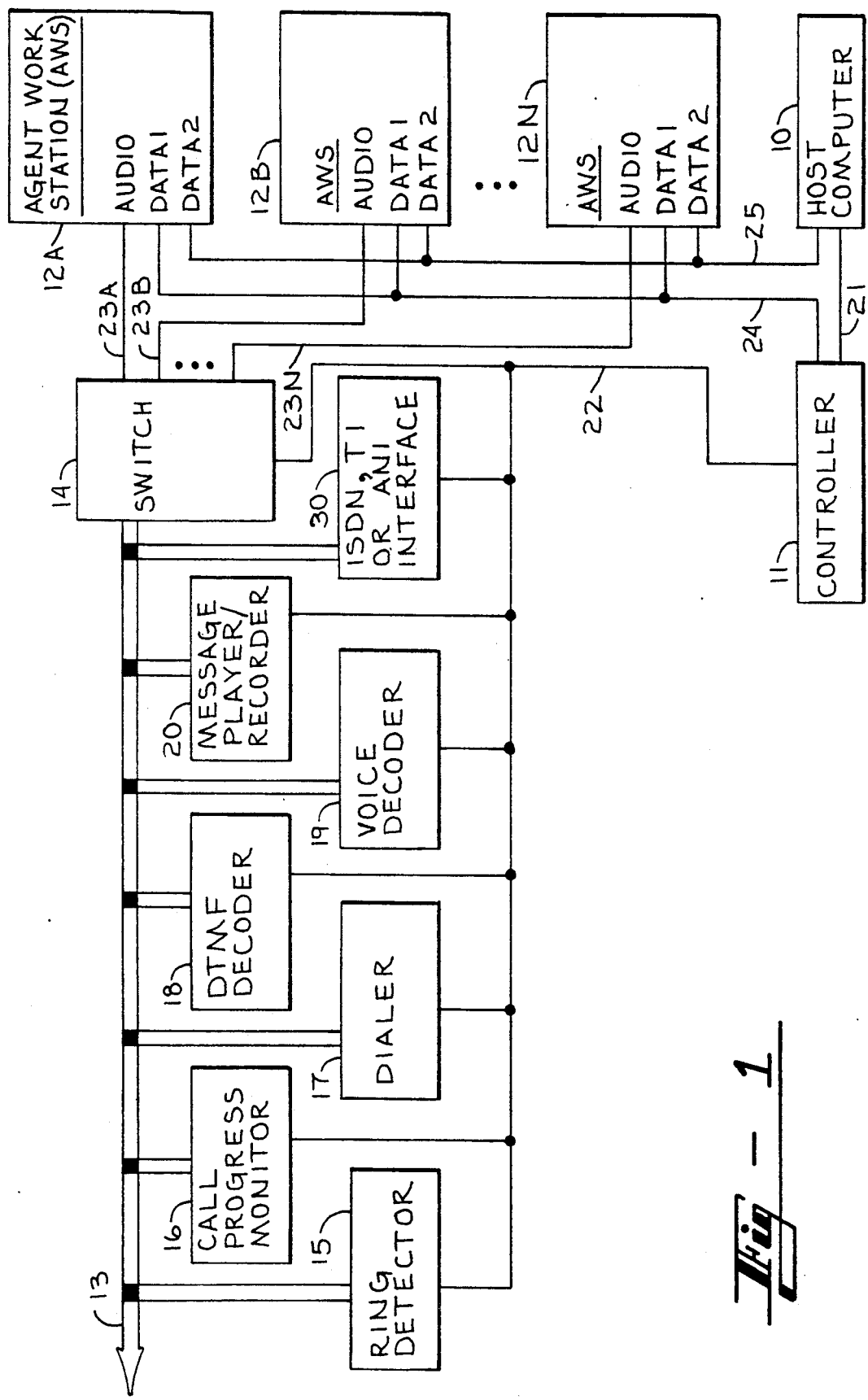
FIG. 1 is a block diagram of the preferred environment of the present invention.

Turn now to the drawing in which like numerals represent like components throughout the several figures. FIG. 1 is a block diagram of the preferred environment of the present invention. The automated telephone call processing system illustrated is connected to a host computer 10 and includes a system controller 11, a plurality of agent work stations (AWS) 12A-12N, telephone trunk lines 13, a switch 14, such as a PBX, or automatic call distribution (ACD) switch, or a crosspoint switch, an incoming call ring detector 15, an outgoing call progress monitor 16, a dialer 17, a DTMF decoder 18, a voice decoder 19, and a message player/recorder 20. Additional work stations, controllers, and/or host computers may also be connected by one or more networks, such as a local area network (LAN). Message player/recorder 20 may be a digital or an analog device. Each agent work station comprises an audio device such as a telephone or a headset, for allowing an agent to converse with a connected party, and a data device, such as a video display terminal, for allowing the agent to send and receive information concerning the connected party. Host computer 10 typically contains a master list of telephone numbers to be called and the name of the corresponding party and, for established accounts, the customer account number or other account identifier, account status, charges/payments etc. In the preferred embodiment controller 11 and the video display terminal in each AWS 12 is an IBM Model PS/2 computer. The system may also have an interface 30 for connecting with Integrated Services Digital Network (ISDN) or a T1 trunk, Automatic Number Identification (ANI), and/or other services which may be provided by the local telephone company. Interface 30 receives the ISDN-T1 or ANI signals corrsponding to the calling party telephone number and provides this telephone number to controller 11. Controller 11 then provides this telephone number to host 10 and/or work station 12. If a telephone number match is found host 10 may then provide the account record to the work station 12 which is connected to the call.

It should therefore be appreciated that the present invention is not limited to use with conventional analog telephone lines. It is contemplated that, where available, trunks 13 will be one or more ISDN-T1 trunks and interface 30 will replace and perform the functions of ring detector 15, call progress monitor 16, dialer 17, and/or DTMF decoder 18, because relevant information will be transferred as digital data to/from the local telephone company over trunks 13.

In the preferred embodiment, host computer 10 transfers or downloads a batch of account records, or selected parts of a batch of account records, to controller 11 over signal path 21, which may be coaxial cable, fiber optic cable, a local area network, etc. Also, host computer 10 provides individual account records when requested by an agent or by controller 11 for real-time processing and handling of inbound calls. The host 10 therefore provides for "demand" operation. If real-time updating of the records in host 10 is not required then the transfer may also be by magnetic tape or disk. For an outbound call controller 11, via control bus 22, instructs dialer 17 to seize one of the trunk lines of trunk group 13 and dial the desired telephone number. Dialer 17 then inspects the line voltages or signals to determine if the trunk is available. If available the dialer 17 seizes the trunk and dials the telephone number. Call progress monitor 16 then advises controller 11 whether the outbound call is still ringing, has been answered, is busy, etc. If the outbound call is answered and an agent is available, then controller 11 will instruct switch 14 to connect the particular trunk line 13 to the audio port of the available agent work station 12 over the appropriate audio signal path 23. Controller 11 also sends, via signal path 24, the account information to the DATA1 port of the work station 12, and/or may cause host computer 10 to send the information over signal path 25 to the DATA2 port of the work station, and/or may send information to the work station which is sufficient to allow the work station to request, either automatically or in response to a key entry by the agent, more information from the host computer 10. It will be appreciated that some PBX's, in addition to performing the function of switch 14, also perform ring detection, dialing, and/or call progress detection. In this case controller 11 would communicate with the PBX to perform the functions of ring detector 15, dialer 17, and/or call progress monitor 16.

If an agent is not available then controller 11 will, as selected, cause message player 20 to play an appropriate holding message to the called party, or cause dialer 17 to hang up and then mark the account to be called again later. When an agent becomes available controller 11 will, as selected, cause the available agent to be connected to the called party which has been on-hold for the longest time, or cause the available agent to be connected to a called party which has just answered the call. If the on-hold time exceeds a predetermined threshold then controller 11 will, as selected, cause message player 20 to play a message thanking the party for holding and indicating that the call will be tried again later, cause message player 20 to play a message which is intended to elicit a response from the called party and, via tone decoder 18, voice decoder 19, and/or message player 20, record the response for playback to an agent at a later time, or cause the call to be transferred to an agent in a different campaign, or to a different telephone number.

For inbound calls, ring detector 15 or Interface 30 detects the telephone company ringing signal on the telephone trunk and advises controller 11 that an inbound call is present. Controller 11 will cause the incoming call to be immediately connected to a work station if an agent is available or, if an agent is not available, will cause message player 20 to play an appropriate holding message or interactive messages to the calling party. When an agent becomes available, the incoming call will be connected to the available agent. If the on-hold time for the calling party exceeds a predetermined time the controller 11 will, as selected, cause message player 20 to play a message thanking the party for holding and advising the party to call again at a later time or to play a message telling the party that the call is being transferred elsewhere, cause the call to be transferred to an agent in another campaign, cause message player 20 to play messages intended to elicit responses from the calling party and record these responses for an automatic return call or for later playback to an agent, or conduct an interactive session with the connected party.

For both inbound calls and outbound calls, before the calling party or called party is connected to an agent, or if an agent is not available, controller 11 may conduct an interactive session with the party using DTMF decoder 18 and/or voice decoder 19 and/or message player/recorder 20. Typically, the messages will prompt the party to provide his/her account number, telephone number, and/or information which can be provided using the telephone DTMF keypad of the party, or which can be provided using a predetermined group of words, such as yes, no, numbers 0-9, etc. Systems capable of conducting interactive sessions are described in U.S. Pat. Nos. 4,797,911 and 4,894,857, both of which are assigned to the assignee of the present invention. If, after an interactive session, the assistance of an agent is desired or required, controller 11 will pass the information obtained from the interactive session to the work station 12 and/or host computer 10. The host 10 searches the database for matching account information, such as the account number or the telephone number, and, if that account exists, the account record is then passed to the work station 12 for use by the agent. If a match is not obtained then the agent will, via workstation 12, be provided with a blank form, with some of the blanks filled in with any information obtained during the interactive session.

Although controller 11 is shown as being separate from host 10 the present invention is not so limited. The functions of controller 11 may, if desired, be performed by host 10, in which case signal paths 21 and 24 would be eliminated and signal path 22 would be connected to host 10 instead of controller 11. If switch 14 is a PBX or ACD which performs functions in addition to switching, such as ring detection, call progress detection, etc., then signal path 22 is used to control the PBX/ACD so that the PBX/ACD also performs the additional functions.

Also, the configuration of FIG. 1 is intended to be exemplary, and not limiting. Examples of other configurations with which the present invention may be used are token ring networks, star networks, and networks shown in U.S. Pat. Nos. 4,797,911 and 4,894,857.

FIG. 2 is an illustration of the allocation of the trunk lines between inbound and outbound calling status. It is essential that logically contiguous trunk lines be assigned to accommodate the group hunt feature or line rotation feature which many PBX's, ACD's and central offices use, especially when only one primary number is used for inbound calls. The primary number is assigned to trunk line number 1 and if trunk number 1 is busy the other incoming calls are routed to trunk numbers 2, 3, 4, etc. In the preferred embodiment, a combination of fixed inbound, selectable, and fixed outbound trunks are used. In addition, the selectable trunks may be designated as temporary inbound trunks, including buffer trunks, or temporary outbound trunks. Because inbound calls begin with trunk number 1 and rotate toward trunk G then, to avoid conflicts or "glare", outbound calls begin with trunk G and rotate toward trunk 1. Outbound calls are restricted to trunks D-G. Inbound calls are effectively restricted to trunks 1-C by the system simply refusing to recognize or answer incoming calls on trunks D-G. If an outbound call is to be placed on, for example, trunk D and ring detector 15 detects the incoming call ringing signal on trunk D then controller 11 will not cause the call to be answered and will simply not use trunk D until the calling party has hung up and the ringing signal has terminated. It will be appreciated that variations of the above groupings may be used so that the number of trunks in any group may be as small as zero or as large as the total number of trunks. For example, the user may elect to have no fixed inbound trunks and no fixed outbound trunks, in which case all trunks would be selectable trunks and could be allocated for inbound duty or outbound duty, as required.

With respect to the trunks 13, the terms "highest", "lowest", "ascending", "descending", and "contiguous" are defined by the connection of trunks 13 to the ports of PBX/ACD/switch 14 and by the programming of PBX/ACD/switch 14. Typically, Port 0 is programmed to be the lowest numbered telephone trunk and Port M is programmed to be the highest numbered telephone trunk, with Ports 1-M being considered to be contiguous. It will therefore be appreciated that the telephone number 555-1212 could be considered to be a lower, contiguous telephone number than 555-1200, by connecting the trunk for 555-1212 to Port 0 and the trunk for 555-1200 to Port 1.

A moving window acts as a buffer between the highest numbered busy inbound trunk (HBIT) and the lowest numbered outbound trunk (D). The buffer size may be selected by the user or may be a dynamic variable. This window provides protection against glare. As the number of inbound calls increases the busy inbound trunks will encroach on the window, thus causing the window to shrink below its selected size. This activates a process to restore the window on its selected size. This is accomplished by reallocating the busy trunks in the window to the general inbound trunk category and by reallocating the same number of trunks from the outbound trunk category to the window, thereby effectively transferring trunks from outbound duty to inbound duty.

Similarly, as the number of inbound calls decreases the busy inbound trunks will retreat from the window, thus causing the window to expand above its selected size. This also activates the process to restore the window to its selected size. This accomplished by allocating unused non-window inbound trunks to the window and by allocating the same number of trunks from the window to the outbound trunk category, thereby effectively transferring trunks from inbound duty to outbound duty.

In the preferred embodiment, reallocation is performed, if needed, every second so that the window moves or "slides" up and down through the selectable trunk group at the rate of one trunk per second.

The system can accommodate rapid increases in the number of inbound calls and still avoid glare because the inbound calls must first fill all the trunks in the inbound trunk category, including the trunks in the buffer, before the inbound calls can affect any trunk designated for outbound service.

The designation of trunks 1-A as fixed inbound lines is arbitrary and is programmable. For example, it may be determined that, for a particular campaign, a minimum of ten inbound trunks is required. Therefore, A=10. However, if later in the campaign it is determined that more inbound lines are consistently required then A can be programmed to equal, for example, 15. The particular number of fixed inbound lines is always selected to be a minimum. For example, if it has been determined that the volume of incoming calls keeps seven agents busy at all times then A would be set to seven. This mininum value is chosen so as to allow more lines to be available for allocation to inbound or outbound calls, as required, and so that agents designated solely for inbound call handling will always be busy.

In the preferred embodiment, boundaries A and F are set at the beginning of a session and are not variable during a session. Also, as mentioned above, the user may select to have no fixed inbound trunks, no fixed outbound trunks, or both. Only boundaries C and D are variable during a session. However, it should be understood that this is a design choice and is not a limiting requirement.

Boundaries A and F may be dynamically variable in response to current conditions. It will be appreciated that boundaries C and D are dynamically variable and move at a relatively fast rate (one trunk per second) to reallocate the trunks between inbound duty and outbound duty. Therefore, boundaries A and F, if dynamic, move at a slower rate so as to more closely follow the average number of simultaneous inbound calls and the average number of simultaneous outbound calls, as determined over the past 3 to 10 minutes.

The present invention also accommodates simultaneous distinct campaigns. For example, if there are M trunks then trunks 1-G would be dedicated to a first campaign, trunks H-I would be dedicated to a second campaign, trunks J-K would be dedicated to a third campaign, and trunks L-M would be dedicated to campaigns 4 through N. Within each group of trunks (1-G, H-I, J-K, and L-M) the trunks are further divided, as necessary or as desired, into fixed inbound trunks, selectable trunks, and fixed outbound trunks, and the selectable trunks are subdivided into temporary inbound trunks, including window or buffer trunks, and temporary outbound trunks. For each campaign the lowest numbered trunk line (1, H, J, and L) would have the primary inbound calling number, and outbound calls would begin with the highest numbered trunk in the group (G, I, K, and M) and work toward the lower numbers of that group.

However, global pooling of all trunks may be preferred in many cases so as to allow all campaigns to share the use of all trunks. Outbound calls are placed beginning with trunk M and working toward trunk 1, with any particular trunk only being temporarily assigned to a particular campaign. In this case, by way of example, trunks 1-G may be designated as fixed inbound trunks, trunks H-K designated as selectable trunks, and trunks L-M designated as fixed outbound trunks.

Inbound calls received while all the agents are busy are placed in an "inbound hold queue". Outbound calls answered while all the agents are busy are either placed in an "outbound hold queue" or disconnected and marked for later recall. An "inbound threshold" is user programmable to establish the priority for connecting agents to calls which are on-hold. One option provides that inbound calls have priority, regardless of the on-hold time. Another option provides that the call with the longest on-hold time has priority. This threshold can therefore be used to set the "weight" or priority of inbound calls with respect to outbound calls.

The system controller searches for the first available agent to connect to the highest priority call. For inbound calls, the controller will first attempt to connect an available agent which is assigned to the "inbound"

campaign corresponding to the inbound call. The controller will then attempt to connect the inbound call with another agent assigned to that campaign who is handling inbound calls or both inbound calls and outbound calls. If no agents are available in that particular campaign the controller will attempt to connect the call to an available agent assigned to the next consecutive campaign, and so forth. The inbound threshold parameter still applies in determining whether an inbound call or an outbound call has priority for connection to the first available agent.

Figure 3A:
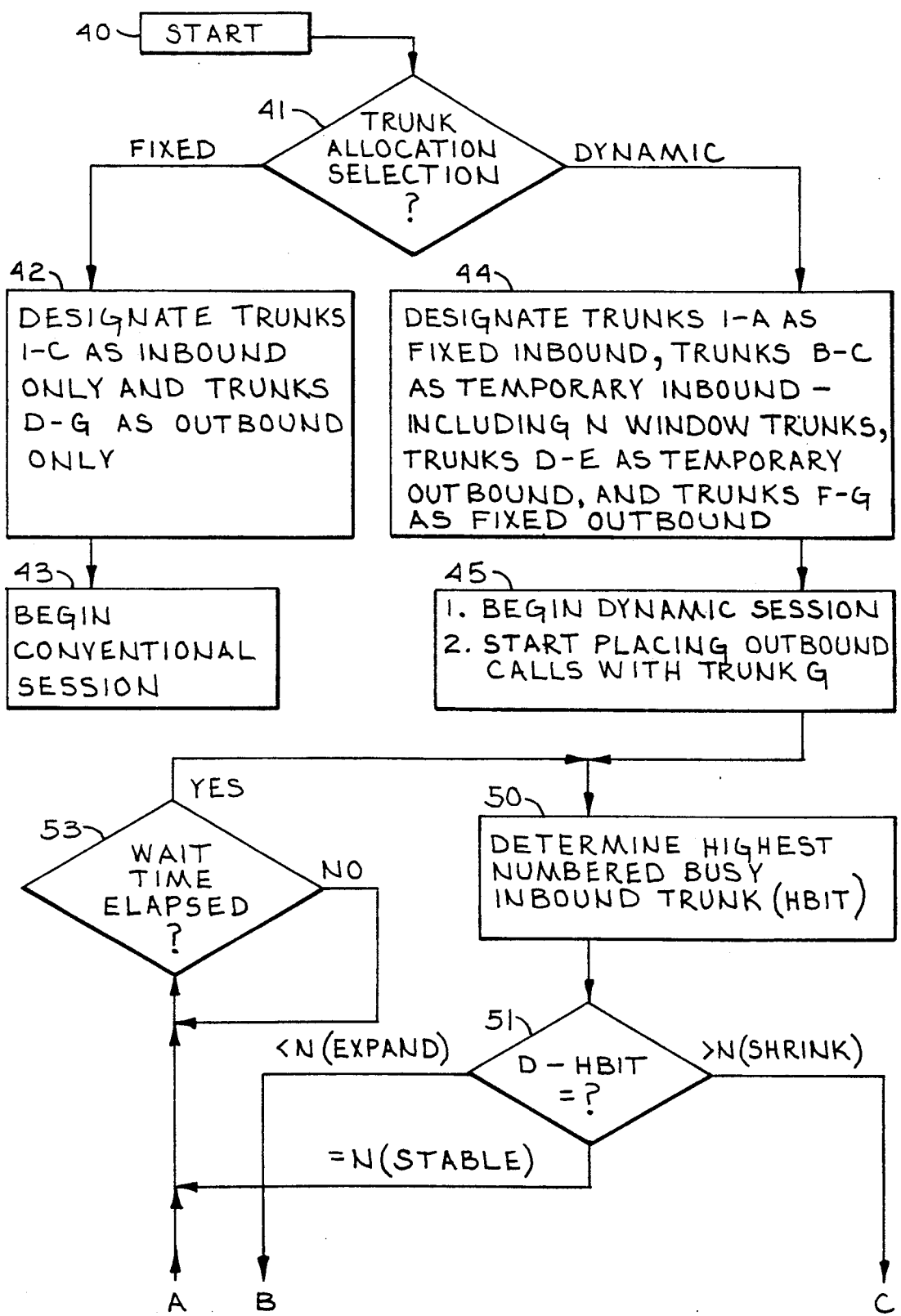
FIGS. 3A and 3B are a flow chart of the inbound-/outbound trunk allocation control process.
Figure 3B:
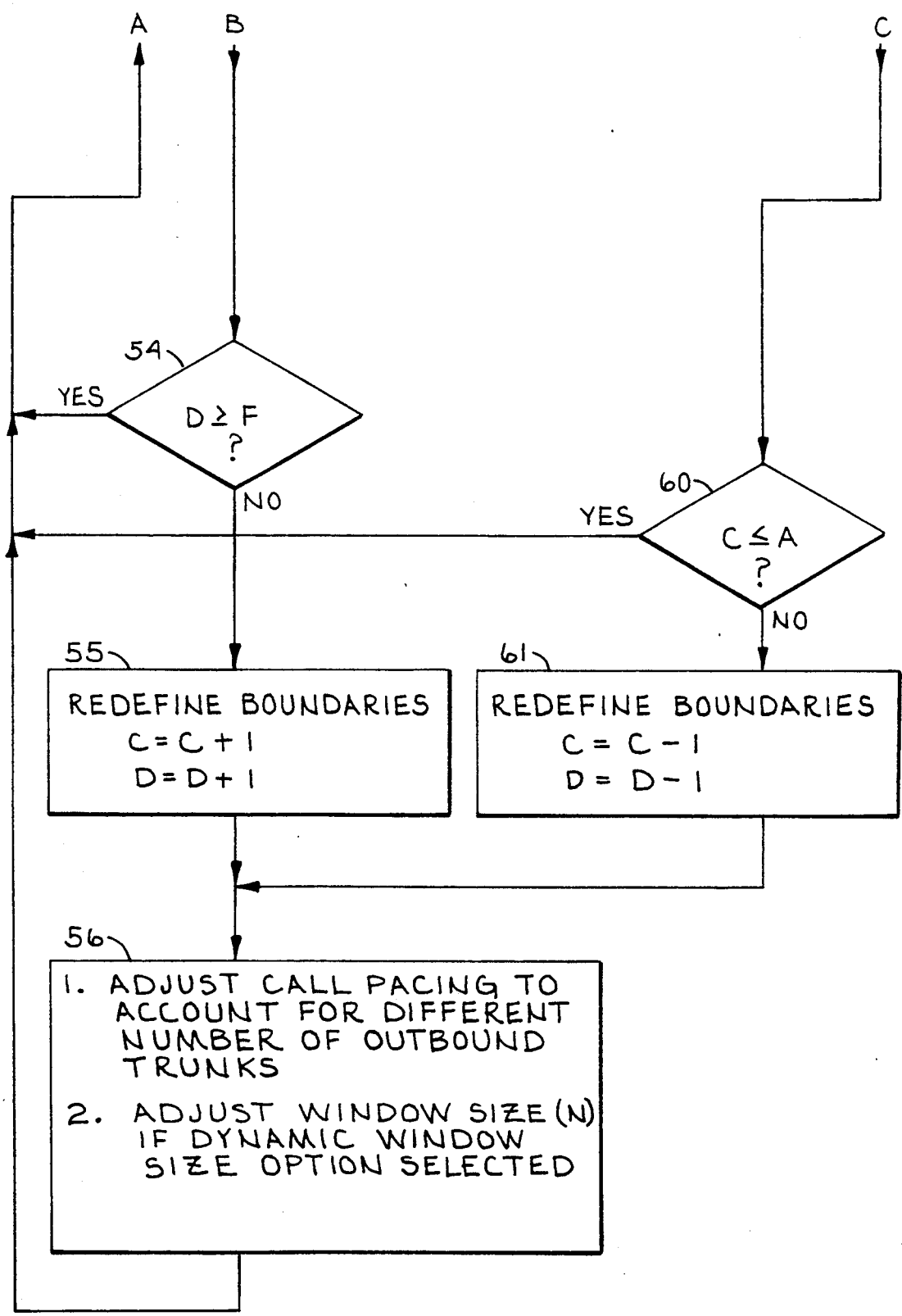

FIGS. 3A and 3B are a flow chart of the inbound/outbound trunk allocation control process. Upon starting 40, decision 41 determines whether fixed trunk allocation or dynamic trunk allocation has been selected. The selection is made by the user prior to the beginning of a session.

If a fixed trunk allocation was selected then, in step 42, trunks 1-C are designated as inbound only trunks and trunks D-G are designated as outbound only trunks. A window is generally not used if a fixed trunk allocation is selected. The C/D boundary between inbound and outbound trunk usage is therefore selected by the user prior to the beginning of the session. Then, in step 43, a conventional call processing session begins.

If dynamic trunk allocation is selected then, in step 44, trunks 1-A are designated as fixed inbound trunks, trunks B-C are designated as temporary inbound trunks, including the N window trunks, trunks D-E are designated as temporary outbound trunks, and trunks F-G are designated as fixed outbound trunks.

The user may also elect to have no fixed inbound trunks, no fixed outbound trunks, or all selectable trunks.

The window size is the number of trunks allocated to function as a buffer between the highest numbered busy inbound trunk (HBIT) and the lowest numbered outbound trunk (LOT). Two different window size options are available. In one option the user selects a fixed window size. If desired, the user may elect to have no buffer by setting the window size to zero.

In another option the window size is dynamically variable. The user may select a starting size or a default starting size will be used. Thereafter, the window size will be dependent upon calling conditions. If the inbound calling traffic has fast and large variations in volume then the window will be made larger so as to prevent the inbound calls from encroaching into the trunks designated to handle outbound calls. This reduces the probability of glare. If the inbound calling traffic has slow and small variations in volume then the window size will be made smaller so as to allow more trunks to be placed into service, rather than allowing the trunks to be unused while in the buffer. This maximizes the utility of the trunks that the user has available. In one embodiment the window size is a fraction of the difference between the maximum number of simultaneous inbound calls and the minimum number of simultaneous inbound calls for inbound calling traffic for the past 5 to 10 minutes. This time value is not critical and other values may be used to provide a more responsive or a more stable window size.

In another embodiment, statistics are kept and updated for a look-up table regarding the average rate of increase in inbound calls per unit time for a given number of inbound trunks. Then, when P inbound trunks are in use, the table is consulted to determine the number of trunks required for the window. Other statistical methods may also be used to determine the current window size.

In step 45 the dynamic session is begun and outbound calls are placed starting with trunk G and working toward the lower numbered trunks. It will be recalled that, because of the rotary group hunt feature, inbound calls start with the primary number (line 1) and work up. Therefore, in the preferred embodiment, outbound calls are always placed using the highest numbered outbound trunk which is available. This concentrates the outbound calls at the higher numbered trunks and allows lower numbered trunks to be more easily reallocated between inbound service and outbound service. In step 50 the highest numbered busy inbound trunk (HBIT) is determined. Decision 51 determines the difference between the highest numbered busy inbound trunk and the lowest numbered outbound trunk (D). If this value is less than the nominal window size (N) then the actual window size is too small so more trunks are allocated to inbound service by reducing the number of trunks allocated to outbound service. If the difference is greater than the nominal window size (N) then the actual window size is too large, which means that there is an excessive number of inbound trunks. Therefore, the number of trunks allocated to inbound service is reduced and more lines are allocated to outbound service. If the difference is equal to N then a stable condition is present and the trunk allocation is not changed. From the above it will be appreciated that trunk HBIT is the most significant inbound trunk, and trunk D is the most significant outbound trunk, because these trunks are used to determine the actual window size.

It will be appreciated that decision 51 determines the degree of usage of the inbound trunks by determining the number of unused (window) trunks present between the highest numbered busy inbound trunk (HBIT) and the lowest numbered outbound trunk (trunk D), or between the highest numbered busy inbound trunk (HBIT) and the highest numbered inbound trunk (trunk C). In an alternative embodiment, the degree of usage of the inbound trunks is determined by evaluating each inbound trunk for a busy or a not-busy condition, counting the number of busy inbound trunks, and comparing this number with a total number of inbound trunks.

If the difference is less than N then decision 54 determines whether trunk D is a fixed outbound trunk, i.e., trunk D is greater than or equal to the lowest numbered fixed outbound trunk (F). If so then trunk D cannot be reallocated and a return is made to step 50 through wait timer 53. If not then in step 55 the temporary inbound/outbound boundaries are redefined by incrementing parameters C and D. In step 56 the call pacing algorithm is adjusted to account for the different (reduced) number of outbound trunks. If the dynamic window size option was selected the window size (N) is adjusted. The window size may also be a non-linear function, such as one which decreases as the number of inbound trunks approaches its historical inbound peak. The non-linear function maximizes the utility of the available trunk lines. It will be appreciated that, as the number of inbound trunks approaches its historical inbound peak, the need for a large window size is minimal and therefore the number of trunks in the window should also be minimal. A return is then made to step 50 through wait timer 53. In the preferred embodiment, the procedure is executed at the rate of one update per second. This time period is not critical. Therefore, decision 53 prevents a return to step 50 until the wait time has elapsed.

If, at decision 51, the difference is greater than the window size (N) then decision 60 determines whether the highest numbered inbound trunk, trunk C, is a fixed inbound trunk, i.e., trunk C is less than or equal to the upper boundary (A) of the fixed inbound trunks. If so then this trunk cannot be reallocated for outbound calling and a return is made to step 50 through wait timer 53. If not then trunk C can be reallocated for outbound service. Then, in step 61, the temporary inbound/outbound boundaries are redefined by decrementing parameters C and D. Again, in step 56, the call pacing algorithm is then adjusted to account for the different (increased) number of outbound trunks. A return is then made to step 50 through wait timer 53.

If, at decision 51, the actual window size is equal to the nominal window size (N) then a stable condition is present so a reallocation of trunks is not necessary. A return is then made to step 50 through wait timer 53.

It will be appreciated that, if a sufficient inbound calling volume occurs, all of the selectable trunks may be allocated to inbound calls, and the actual window size may be zero, i.e., the window collapses. Conversely, there may be a minimal inbound calling volume. In this case, depending upon the number of agents and the outbound call hit rate, all of the selectable trunks may be allocated to outbound calls and the window may collapse (large number of agents on duty and/or low hit rate), or the window may balloon (small number of agents on duty and/or high hit rate).

In another alternative embodiment the inbound/outbound boundary (C/D) does not exist. That is, any selectable trunk (B-E) may be designated as an inbound trunk or an outbound trunk, without regard to whether the trunk is the highest numbered inbound trunk or the lowest numbered outbound trunk. For example, trunks B through B+5 may be allocated to inbound calls, trunks B+6 through E−4 may be allocated to outbound calls, and trunks E−3 through E may be allocated to inbound calls. In this case, it is necessary to keep a record of the current designation for each trunk. This can be readily accomplished through a trunk status table. In this alternative embodiment there is the disadvantage that the group hunt feature of the local telephone company and/or the PBX/ACD 14 may cause some or all of the outbound trunks to be occupied with inbound calls, even if the inbound calls are not being answered.

Figure 4:
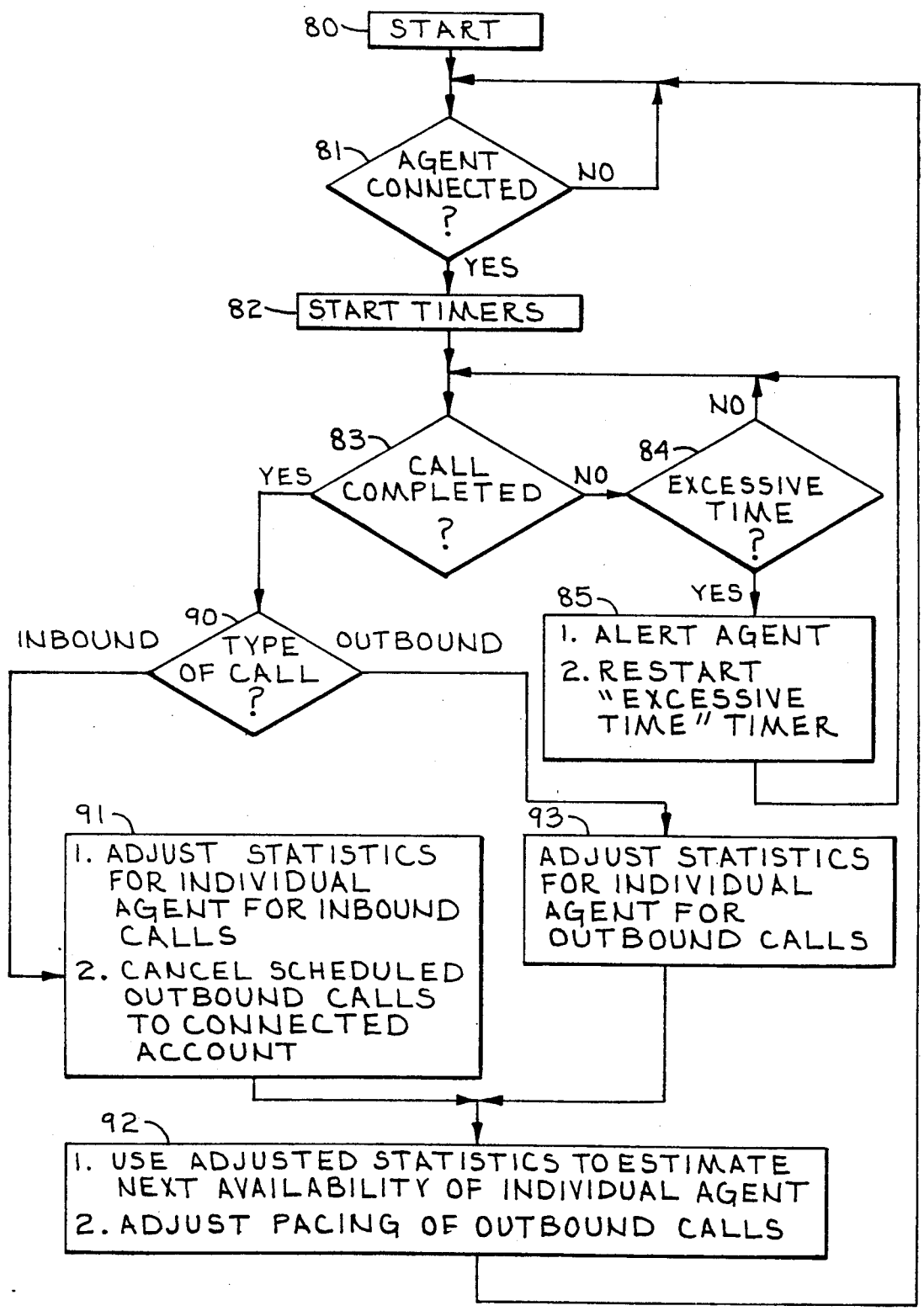
FIG. 4 is a flow chart of the procedure for updating statistics for the call pacing algorithm.

Turn now to FIG. 4 which is a flow chart of the procedure for updating agent statistics used by the call pacing algorithm. In the preferred embodiment the statistics for each individual agent are kept separately from the statistics for any other agent, and the statistics for an individual agent are broken into inbound call statistics and outbound call statistics. Of course, group statistics can also be kept, or determined from the individual statistics. This separation of individual statistics allows for a more accurate prediction of when each agent will become available and of the need for originating additional outbound calls. For example, in a case where all inbound calls are being handled (not on-hold) and all agents are talking with the customers the system can anticipate the next inbound call based upon the history of inbound calls, predict the availability of each agent based upon the individual history of that agent for inbound calls, and predict the need and timing for the next outbound call based upon a prediction of individual agent availability after considering predicted inbound calls. Inbound calls and outbound calls have a different nature and therefore typically have a different duration. Separate statistics for inbound calls and outbound calls allows the prediction process to be accomplished with greater accuracy. To achieve this result the procedure shown is executed for each individual agent.

Upon starting 80, decision 81 determines whether the individual agent is connected to a call. Once the agent is connected then various timers, such as call duration timers and excessive time timers, are started. Decision 83 determines whether the call has been completed. If not decision 84 determines whether an excessive time has been spent on the call. If not then a return is made to decision 83. If an excessive time has elapsed, then step 85 alerts the agent that an excessive talk time has occurred and restarts the excessive time timer. Step 85 may also change the criteria for the excessive time so that the excessive time alerts occur at more frequent or less frequent intervals. After completion of step 85 a return is made to decision 83.

Once a call is completed then decision 90 determines whether the call was an inbound call or an outbound call. If an inbound call then step 91 adjusts the statistics, such as the total call duration, the number of calls, the average call duration, time of day, day of week, maximum or minimum call duration, etc., for that individual agent for inbound calls. In some environments, such as collection agencies, an inbound call from a customer will eliminate the need for further outbound calls to that customer or account. Therefore, in such an environment, step 91 also cancels scheduled outbound calls to that customer or account. This cancellation may be accomplished: automatically, as when the agent enters the account number on an inbound call or the calling party enters or speaks his/her account number, telephone number, etc.; or manually, such as the agent determining that the inbound call has accomplished the purpose for which the outbound call was intended and then pressing the proper key or key sequence to cancel future outbound calls.

Figure 5:
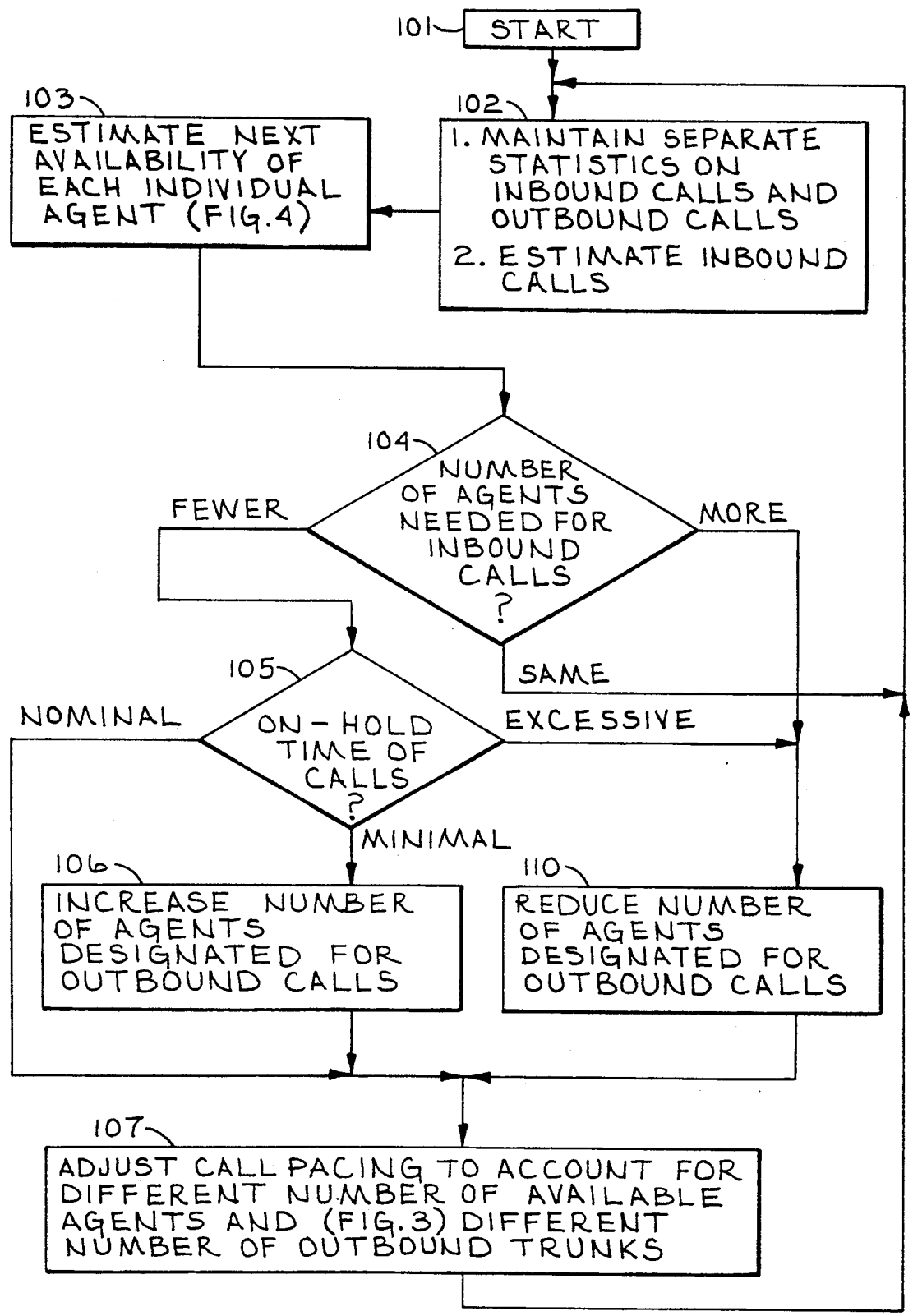
FIG. 5 is a flow chart of the procedure for adjusting the outbound call pacing.

Step 92 uses the adjusted statistics for that individual to estimate the time when that individual will next be available and, as described in more detail in conjunction with FIG. 5, adjusts the pacing of the outbound calls accordingly. A return is then made to decision 81. If, at decision 90, the call is an outbound call then, in step 93, the statistics for the individual agent for outbound calls are adjusted. Step 92 then uses the adjusted statistics to adjust the pacing of outbound calls.

In the preferred embodiment a moving window is used for generation of the statistics. In one version the statistics are based upon the most recent N calls. In another version the statistics are based upon calls handled within the past N minutes. A lower value for N provides statistics which respond faster to changing conditions, whereas a higher value for N provides statistics which are less susceptible to one or a few calls of an unusual duration. In the preferred embodiment, the most recent 20 calls are used.

The availability of an agent may be estimated by, for example, determining whether the present call is an inbound call or an outbound call, and then subtracting from that agent's historical average time for that type of call the amount of time that the agent has been on the present call. In the preferred embodiment, the last 20 calls are used to generate the statistics for an agent. Of course, rather than a simple historical average, weighted times may be used. E.g., if this agent has been on an inbound call for X minutes then, on the average, the call will have a total duration of Y minutes, or the agent will be available in Z minutes. These weighted times are conveniently stored in a look-up table which is generated using statistics gathered for that agent over a predetermined number of calls.

FIG. 5 is a flow chart of the procedure for adjusting the outbound call pacing. After starting 101, step 102 estimates the rate of occurrence and the duration of future inbound calls based upon statistical data for previous inbound calls. The estimates may be based on the last N calls or the calls within the last N minutes. In the preferred embodiment, the last 20 calls are used. Typical statistics for inbound calls are the call duration and the time between inbound calls. Statistics for outbound calls are the call duration and the hit rate. In the preferred embodiment the hit rate is based upon the last 100 calls. Step 103 estimates the next availability of each individual agent, based upon the statistics of FIG. 4 and whether an individual agent is currently engaged in an inbound call or an outbound call. Based upon these estimates, decision 104 determines whether more, fewer, or the same number of agents are needed to accommodate the estimated incoming calls. If fewer agents are needed then decision 105 determines whether the on-hold time of existing calls is minimal, acceptable, or excessive. If the on-hold time is minimal then step 106 increases the number of agents available for outbound calls. Then, step 107 adjusts the outbound call pacing to account for the different number of available agents and, from FIG. 3, for the different number of outbound trunks. After considering the number of operators and trunks required to handle current and predicted inbound calls, step 107 uses the statistics gathered for individual agents and for past outbound calls to predict the need for and timing of additional outbound calls. For example, if an incoming call is arriving, or is projected to arrive before or at approximately the same time as an agent is projected to be available, then the outbound call is delayed. Outbound calls are therefore delayed until an agent is projected to be available to handle the outbound call. A return is then made to step 102.

If the on-hold time of the inbound calls is acceptable (nominal) then there is no need to change the number of agents and step 107 is executed. It will be appreciated that step 107 may be skipped and a return made directly to step 102 if there is no change in the number of operators or the number of trunks.

If more agents are needed for inbound calls (decision 104), or if the on-hold time of the calls is excessive (decision 105), then step 110 reduces the number of agents which are available for outbound calls. Step 110 may also cancel (terminate in progress or hang up) selected outbound calls, such as those which have not yet been completely dialed, or have rung the longest but not yet been answered. Step 107 then adjusts the outbound call pacing to account for the different (reduced) number of available agents and the different number of outbound trunks. A return is then made to step 102.

If, at decision 104, there is no change in the number of agents projected to be needed for inbound calls then a return is made to step 102.

The present invention is concerned with adjusting the pacing of outbound calls in response to the volume of inbound calls and outbound calls, adjusting the pacing of outbound calls by predicting the availability of each agent based upon whether that agent is currently handling an inbound call or an outbound call, and controlling the handling of inbound calls based upon the on-hold time of current inbound calls, the relative priority of inbound calls and outbound calls, and the volume of outbound calls.

Furthermore, the present invention is concerned with the allocation of the trunk lines between handling inbound calls and handling outbound calls. From one viewpoint, inbound calls are considered to have a higher priority than outbound calls because it may be assumed that the calling party wishes to transact business whereas, for an outbound call, it is uncertain whether the called party will answer or be responsive to the call. As the frequency and/or duration of the inbound calls increases more and more trunk lines, and agents, are allocated to handling incoming calls. When the frequency and/or duration of inbound calls decreases more trunk lines, and more agents, are allocated for handling outbound calls. The ratio of inbound trunks to outbound trunks is therefore variable and dynamically changes in response to the current operating conditions. Each time that the number of outbound trunks is changed the outbound call pacing algorithm is adjusted to account for the different number of outbound trunks available and for the different performance (for inbound calls or for outbound calls) of each agent.

From another viewpoint, outbound calls are considered to have a higher priority than inbound calls because a calling party will tolerate being placed on hold, and being placed on hold for a longer time, than a called party will tolerate. Therefore, inbound calls are handled in accordance with the selection of one or more of the following options: the inbound call is answered and connected to an available agent; the inbound call is allowed to ring for a predetermined time or number of rings before the call is answered; an answered inbound call is placed on hold for up to a predetermined time with or without the playing of a message; an interactive session is initiated and one or more messages are played to obtain a response or responses from the calling party; the system, in response to information provided during the interactive session, automatically calls the calling party back at a later time when an agent is available, or is projected to be available, as selected by the user; inbound calls in excess of a predetermined number are simply not answered; and/or inbound calls in excess of a predetermined number are answered and advised, by a message, to call back at a later time.

The handling of inbound calls is determined by selection of the desired option(s) and/or certain parameters, such as ring time, hold time, maximum allowable number of inbound calls, number of calls in queue, etc. The handling of inbound calls is thus subject to factors which are dependent upon outbound calls: the number of agents available or projected to be available, the number of trunks allocated for outbound calls, the average connection time of outbound calls (and of inbound calls), the "hit rate"—the percentage of outbound calls which are answered, etc.

In one embodiment, inbound calls have control and outbound calls have priority. That is, the number of inbound calls controls the inbound/outbound trunk allocation and the pacing of outbound calls. However, an answered outbound call has a higher priority for connection to an available agent than an inbound call. This is because a calling party will tolerate waiting for an available agent but a called party typically will not wait.

Inbound calls also control the completion of outbound calls. Assume that the outbound call pacing algorithm determines, based upon the statistics for inbound calls, outbound calls, and/or agent performance, that one or more outbound calls should be placed. Controller 11 will then instruct dialer 17 to begin placing the call(s). Assume now that one or more inbound calls arrive, so that the availability of agents to handle the newly placed outbound call(s) is reduced or eliminated. The outbound call pacing algorithm will instruct controller 11 to cause dialer 17 to stop dialing and/or to cause newly placed outbound calls to be terminated. The number of outbound calls cancelled or terminated will depend upon the actual or estimated availability of agents after accounting for the new inbound calls.

If desired, outbound calls may have both control and priority. In this case the answering and/or connection of inbound calls is dependent upon the outbound calling traffic and agent availability. If outbound calling traffic is heavy then: the inbound calls may be allowed to ring for a longer time before they are answered; an anwered inbound call may be placed on hold for a longer time before connection to an available agent; or an inbound call might not be answered at all.

In an alternative embodiment, the call, whether inbound or outbound, with the longest residual wait time will be connected to the next available agent.

Figure 6A:
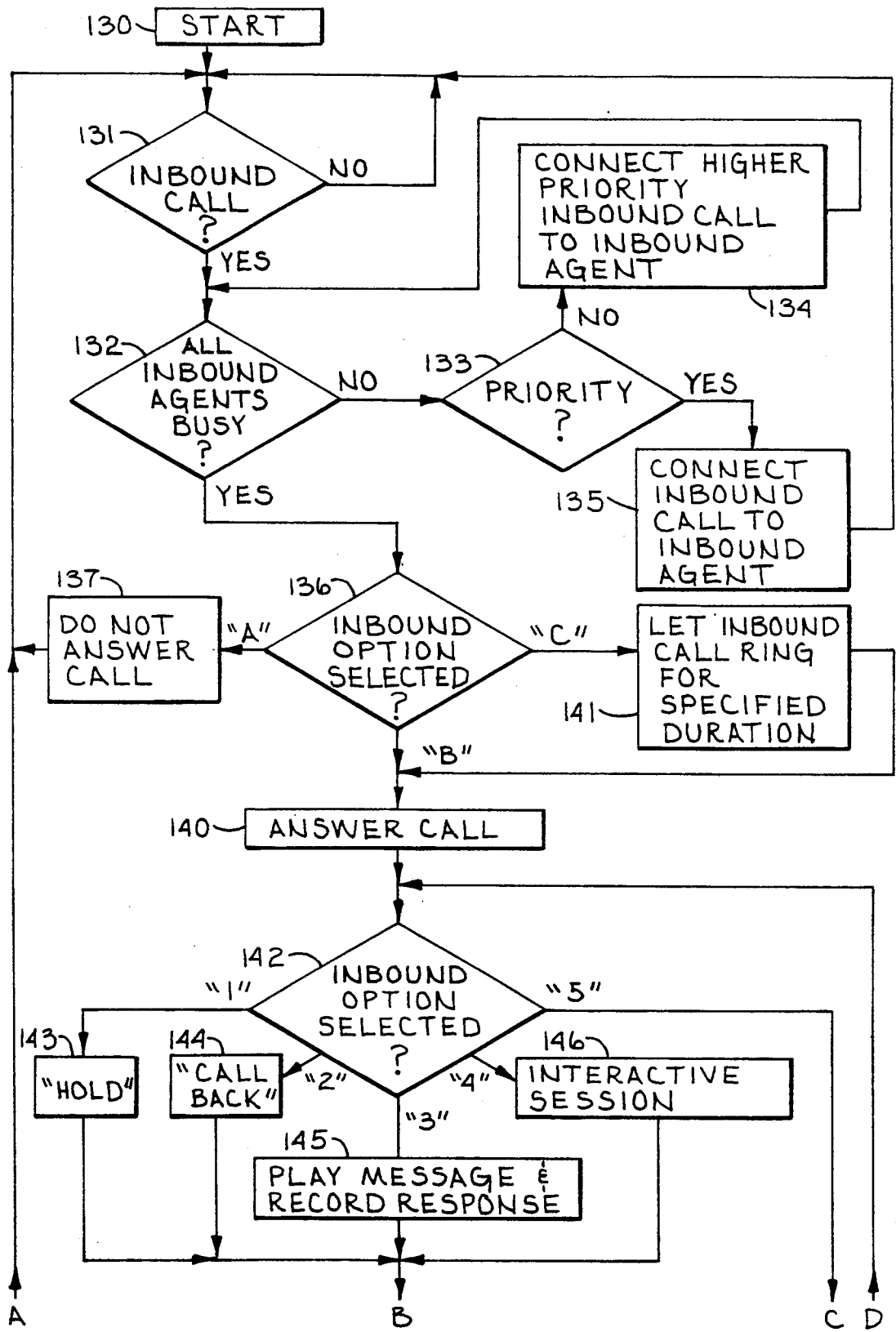
FIGS. 6A and 6B are a flow chart of the procedure for inbound call handling.
Figure 6B:
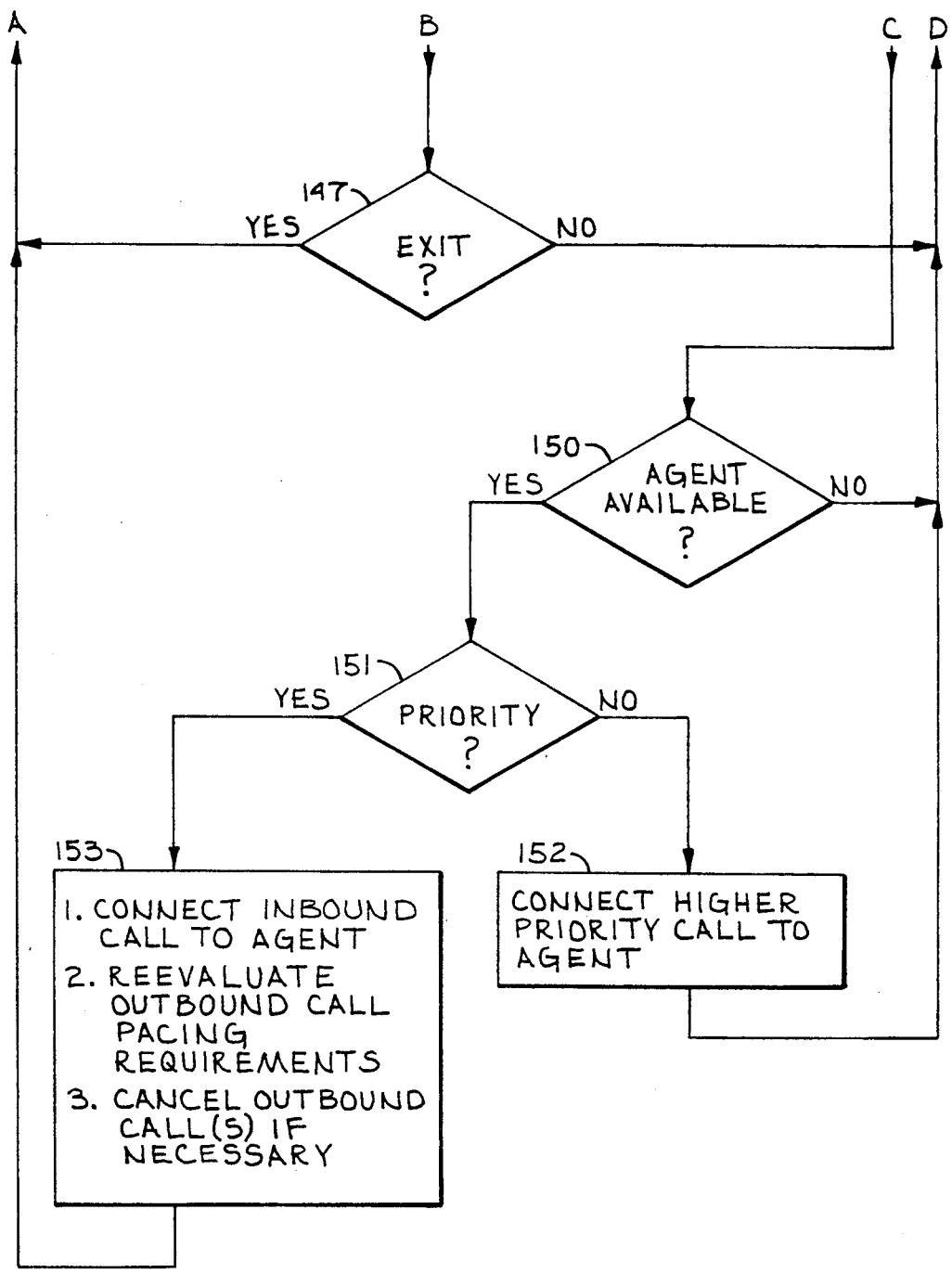

Turn now to FIGS. 6A and 6B which are a flow chart of the procedure for inbound call handling. After starting 130, decision 131 determines whether an inbound call is present. If not a return is made to decision 131. If so, then decision 132 determines whether all agents designated to handle only inbound calls are busy. If not then an agent is available and decision 133 determines whether the current inbound call has priority over other inbound calls. If not then step 134 connects the higher priority call to the available inbound agent and decision 132 is reexecuted. If so then, in step 135, the current inbound call is connected to the available inbound agent and a return is made to decision 131. The priority may be determined by the amount of time the previous inbound call has been on-hold, whether a message is currently being played to the previous inbound call, whether the previous inbound call is involved in an interactive session, etc.

If, at decision 132, all the inbound agents are busy then decision 136 determines whether option A, B, or C was selected. The designations A, B, and C are convenience only. If option A has been selected, then step 137 specifies that the current inbound call is not answered and a return is made to decision 131. If option B was selected then, in step 140, the current inbound call is answered. If, in decision 136, option C was selected then step 141 specifies that the current inbound call will be allowed to ring for a specified duration before it is answered in step 140.

If no agents are designated to handle only inbound calls then steps 132-135 may be eliminated so that the "YES" output of decision 131 goes directly to decision 136.

Decision 142 then determines which of the next set of inbound call handling options has been selected. Again, the numerals "1" through "5" are for convenience only. If option 1 is selected then step 143 places the call on-hold. This typically involves playing a message thanking the party for calling and advising them that they will be connected to an agent when one becomes available. If option 2 is selected then step 144 executes the call back procedure. This typically involves playing a message thanking the party for calling, advising them that all agents are busy, and asking them to call back at a later time. If option 3 is selected then step 145 executes a recording session. In this procedure one or more messages are played and the response of the calling party to the message is recorded. The response would be transcribed by an agent at a later time and the response information entered into the account records. If option 4 is selected then step 146 conducts an interactive session. The interactive session, as described above, typically involves playing a message to the calling party and asking them to enter a response using their telephone or a limited group of spoken words. Steps 143-146 proceed to decision 147 which determines whether an exit is required. If so then a return is made to decision 131. If not then a return is made to decision 142. The decision to exit or not exit may be based upon the on-hold time of the calling party and/or the results of the interactive session of step 146.

If, at decision 142, option 5 is selected then decision 150 determines whether an agent is available. If not then a return is made to decision 142. If so then decision 151 determines whether the current inbound call has priority over all other currently existing calls. If not then, in step 152, the highest priority currently existing call is connected to the available agent, and then a return is made to decision 142. If, at decision 151, the current inbound call has priority then, in step 153, the current inbound call is connected to the available agent, the outbound call pacing requirements are reevaluated based upon the different number of available agents, and one or more outbound calls are cancelled, if necessary. A return is then made to decision 131.

It should be understood that the option paths selected by decision 142 may be determined by a previous action. For example, the initial path may be option 4, which conducts an interactive session, which ascertains that the calling party wishes to speak to an agent. Option 5 then determines that the agent is not available so the calling party is placed on hold by option 1. After a predetermined time option 4 may ask the calling party whether the calling party wishes to remain holding or wishes to call back at a later time. Therefore, the user may specify a fixed, nonvariable option, or the user may specify an initial option, with the actual options being determined by the calling party's response.

It will be seen from the above that the present invention accomplishes inbound/outbound call handling and agent and trunk allocation so that the number of outbound calls is adjusted in response to the frequency and the duration of the inbound calls and the rate of answer and the on-hold time of inbound calls is adjusted in response to the number and duration of outbound calls. The present invention keeps separate statistics for inbound calls and outbound calls for each individual operator, and separate statistics for inbound calls, as a group, and outbound calls, as a group. The present invention therefore improves the accuracy of the prediction of individual agent availability and therefore provides for a more precise call pacing prediction. The call pacing prediction is responsive to the frequency and duration of both inbound calls and outbound calls. The present invention dynamically reallocates the number of trunks and the number of agents available for outgoing calls based upon the volume of the incoming calls and the on-hold time of existing calls. The present invention therefore maximizes the productive time of the agents and minimizes the on-hold time of a called or calling party.

From the above description and the accompanying figures other embodiments of the present invention will suggest themselves to those of skill in the art. Therefore, the present invention is to be limited only by the claims below.

We claim:

1. A method for processing telephone calls, comprising the steps of:
   detecting inbound calls;
   placing outbound calls;
   detecting the answering of said outbound calls;
   selectably connecting said inbound calls and answered outbound calls to a plurality of agents;
   generating statistics concerning said inbound calls and said outbound calls; and
   adjusting the rate of placement of said outbound calls in response to said statistics on said inbound calls and said outbound calls.

2. The method of claim 1 wherein said step of generating statictics comprises;
   determining the average duration of said inbound calls; and
   determining the average duration of said outbound calls.

3. The method of claim 2 wherein said step of generating statistics further comprises:
   determining the delay period between the arrival of a said inbound call and the arrival of a following said inbound call; and
   determining the average delay period between said inbound calls.

4. The method of claim 2 wherein said step of generating statistics further comprises:
   determining the proportion of said outbound calls which are answered.

5. The method of claim 1 wherein said step of generating statistics comprises generating separate statistics for each agent.

6. The method of claim 5 wherein said step of generating separate statistics comprises:
   determining the average connection time for inbound calls for each said agent; and
   determining the average connection time for outbound calls for each said agent.

7. The method of claim 1 wherein said step of adjusting comprises monitoring the number of available agents and said method further comprises terminating a said outbound call in progress if a said inbound call reduces said number of available agents.

8. The method of claim 1 and further comprising:
   allocating a first group of a plurality of telephone trunks to said inbound calls;
   allocating a second group of a plurality of telephone trunks to said outbound calls;
   determining the degree of usage of said first group; and
   adjusting the size of said first group and said second group in response to said degree of usage.

9. The method of claim 8 wherein said step of determining said degree of usage comprises:
   determining the most significant inbound trunk;
   determining the most significant outbound trunk; and
   determining the number of unused trunks between said most significant inbound trunk and said most significant outbound trunk.

10. The method of claim 9 wherein said step of determining said degree of usage further comprises:
    comparing said number of unused trunks with a window value.

11. The method of claim 10 wherein said window value is user selectable.

12. The method of claim 10 and further comprising:
    calculating said window value based upon said statistics for said inbound calls.

13. The method of claim 10 wherein said step of adjusting said size of said first group and said second group comprises:
    increasing the number of said telephone trunks in said first group and decreasing the number of said telephone trunks in said second group if said number of unused trunks is less than said window value; and
    decreasing the number of said telephone trunks in said second group and increasing the number of said telephone trunks in said first group if said number of unused trunks is greater than said window value.

14. The method of claim 1 and further comprising:
    generating statistics concerning each agent of said plurality of agents; and
    wherein said step of adjusting said rate of placement is responsive to said statistics concerning each agent.

15. The method of claim 14 wherein said step of generating statistics concerning each agent comprises:
    determining the average time that each agent is connected to an inbound call; and
    determining the average time that each agent is connected to an outbound call.

16. The method of claim 15 wherein said step of adjusting said rate of placement is responsive to whether a said agent is connected to an inbound call or an outbound call.

17. The method of claim 14 wherein said step of adjusting said rate of placement is responsive to the number of agents available.

18. The method of claim 17 and further comprising:
    terminating a said outbound call in progress if a said inbound call reduces said number of agents available.

19. The method of claim 1 and further comprising:
    measuring the ring time of each said inbound call;
    comparing said ring time to a desired value; and
    wherein said step of selectably connecting comprises connecting said inbound call to an agent only if said ring time exceeds said desired value.

20. A method for processing telephone calls, comprising the steps of:
    detecting inbound calls;
    placing outbound calls;
    detecting the answering of said outbound calls;
    selectably connecting said inbound calls and answered outbound calls to a plurality of agents;
    generating statistics concerning said outbound calls;
    adjusting the rate of placement of said outbound calls in response to said statistics; and
    responding to a next inbound call in a manner determined by said statistics.

21. The method of claim 20 wherein said step of responding comprises:

determining whether the connection of said next inbound call to an available agent will prevent a said outbound call from being quickly connected with an agent; and if so, delaying the answer of said next inbound call.

22. The method of claim 20 wherein said step of responding comprises:
determining whether the connection of said next inbound call to an available agent will prevent a said outbound call from being quickly connected with an agent; and
if so, answering said next inbound call and placing said next inbound call on-hold.

23. The method of claim 20 wherein said step of responding comprises:
determining whether the connection of said next inbound call to an available agent will prevent a said outbound call from being quickly connected with an agent; and
if so, answering said next inbound call, connecting said next inbound call with a said agent, and terminating a said outbound call.

24. The method of claim 20 wherein said step of responding comprises:
determining whether the connection of said next inbound call to an available agent will prevent a said outbound call from being quickly connected with an agent; and
if so, answering said next inbound call, and playing a message to the calling party on said next inbound call.

25. The method of claim 24 and further comprising:
recording any response to said message by said calling party.

26. The method of claim 24 wherein said message prompts said calling party to provide a response using a telephone keypad; and
wherein said method further comprises decoding said response provided by said calling party.

27. The method of claim 24 wherein said message prompts said calling party to provide a response using a predetermined set of spoken words; and
wherein said method further comprises decoding said response provided by said calling party.

28. The method of claim 24 wherein said message prompts said calling party to provide a response including an account identifier.

29. The method of claim 28 and further comprising:
decoding said response of said calling party to said message; and
adding said calling party to a list of parties to be called.

30. The method of claim 29 and further comprising:
placing a call to said calling party when an agent is available.

31. The method of claim 28 wherein said account identifier comprises at least one of the following: a telephone number, an account number.

32. For use with a system which accomodates inbound calls and outbound calls, a method for pacing the placement of said outbound calls, comprising the steps of:
monitoring the time that a predetermined agent is connected to a call;
determining whether said call is an inbound call or an outbound call;
if said call is an inbound call then updating the statistics for said predetermined agent for inbound calls;
if said call is an outbound call then updating the statistics for said predetermined agent for outbound calls;
performing the above steps for each agent of a plurality of agents;
calculating the estimated time at which each of said agents will become available, based upon said statistics and considering whether each of said agents is currently on a said inbound call or a said outbound call; and
placing a next outbound call at a time determined by the projected availability of at least one of said agents.

33. The method of claim 32 and further comprising the steps of:
monitoring the arrival time for each said incoming call;
generating statistics concerning the rate of arrival of incoming calls; and
calculating the estimated time at which a next said incoming call will arrive;
wherein said next outbound call is placed only if sufficient agents are projected to be available to handle both said next incoming call and said next outbound call.

34. The method of claim 32 and further comprising:
monitoring the arrival time for each said incoming call;
placing on-hold, if an agent is not available, said inbound calls and said outbound calls which are answered;
monitoring the on-hold time of each call;
generating statistics concerning the rate of arrival of incoming calls; and
calculating the estimated time at which a next said incoming call will arrive;
wherein said next outbound call is placed only if sufficient agents are projected to be available to prevent said on-hold time from exceeding a predetermined time.

35. The method of claim 34 and further comprising:
monitoring the number of calls which are on-hold;
if said on-hold time of a said call exceeds a predetermined value then handling said call in accordance with a predetermined procedure.

36. The method of claim 35 wherein said step of handling is only performed for inbound calls.

37. The method of claim 35 wherein said system accommodates a plurality of campaigns and said predetermined procedure comprises transferring said call to an agent in a campaign different from the campaign with which said call was associated.

38. The method of claim 35 wherein said predetermined procedure comprises playing a message to the party associated with said call, said message prompting said party to provide a response including an account identifier.

39. The method of claim 32 and further comprising:
monitoring for a new inbound call; and
determining whether the connection of said new inbound call to a next available agent will prevent said next outbound call from being quickly connected with a said agent; and
if so, cancelling said next outbound call.

40. The method of claim 32 and further comprising:
monitoring for a new inbound call; and
determining whether the connection of said new inbound call to a next available agent will prevent said next outbound call from being quickly connected with a said agent; and if so, delaying the answering of said new inbound call.

41. The method of claim 32 and further comprising:
monitoring for a new inbound call; and
determining whether the connection of said new inbound call to a next available agent will prevent said next outbound call from being quickly connected with a said agent; and
if so, answering said new inbound call and placing said new inbound call on-hold.

42. The method of claim 32 and further comprising:
monitoring for a new inbound call; and
determining whether the connection of said new inbound call to a next available agent will prevent said next outbound call from being quickly connected with a said agent; and
if so, answering said new inbound call and playing a message to the calling party on said new inbound call.

43. The method of claim 42 and further comprising:
recording any response to said message by said calling party.

44. The method of claim 32 wherein said message prompts said calling party to provide a response including an account identifier and said method further comprises:
recording said response; and
using said response to call said calling party when an agent becomes available.

45. The method of claim 44 wherein said account identifier comprises at least one of the following:
a telephone number; and
an account number.

46. The method of claim 44 wherein said step of using comprises:
decoding said response; and
adding said calling party to a list of parties to be called.

47. The method of claim 44 wherein an agent listens to and transcribes said response.

48. A telephone call processing system, comprising:
first means for detecting inbound calls;
second means for placing outbound calls by seizing selected ones of a plurality of telephone trunks and dialing telephone numbers thereon;
third means for providing status information concerning said outbound calls by monitoring signals on said selected ones of said telephone trunks;
a plurality of agent work stations, each said agent work station allowing an agent to converse with a connected party and to view information concerning said connected party;
switching means for selectively connecting ones of said telephone trunks to ones of said agent work stations; and
control means connected to said first means, said second means, said third means, said plurality of agent work stations, and said switching means, for storing information concerning customers, for responding to said first means detecting an inbound call on an inbound trunk by causing said switch to connect said inbound truck having said inbound call to an available agent work station, and for sending information to agent work station concerning said customer on said inbound call, for causing an outbound call to be placed on a said outbound trunk by sending a telephone number to said second means, for responding to said third means detecting that said outbound call has been answered by causing said switching means to connect said outbound trunk having said outbound call to an available agent work station, for sending information to said agent work station concerning said customer on said outbound call, for generating statistics concerning said inbound calls and said outboard calls, and for adjusting the rate of placement of said outbound calls in response to said statistics on said inbound calls and said outbound calls.

49. The system of claim 48 wherein said control means generates statistics concerning said agents, estimates the rate of future inbound calls and availability of a said agent, and causes a next outbound call to be placed if a said agent is projected to be available to be connected to said next outbound call.

50. The system of claim 48 wherein said control means comprises means for partitioning said plurality of trunks into inbound trunks and outbound trunks.

51. The system of claim 50 wherein said control means further comprises:
a host device for storing said information concerning said customers; and
a system controller for receiving said information from said host device for use in placing said outbound calls, for partitioning said plurality of trunks, for responding to said first means detecting said inbound call, for placing said outbound call, for responding to said third means detecting that said outbound call has been answered, for monitoring each agent work station, for maintaining and updating statistics for each agent work station, and for calculating the estimated time; and
wherein a predetermined one of said host device and said system controller sends said information to said agent work station concerning said customer.

52. The system of claim 51 wherein said system controller sends said information to said agent work station concerning said customer on said inbound call and said outbound call.

53. The system of claim 51 wherein:
said system controller sends said information to said agent work station concerning said customer on said outbound call; and
said host device send said information to said agent work station concerning said customer on said inbound call.

54. The system of claim 50 wherein said system controller monitors the degree of usage of said inbound trunks, and repartitions said plurality of said trunks in response to said degree of usage of said inbound trunks.

55. An apparatus for placing and receiving telephone calls, comprising:
first means for detecting inbound calls;
second means for placing outbound calls;
third means for detecting the answering of said outbound calls;
fourth means for selectively connecting said inbound calls and answered outbound calls to a plurality of agents; and
control means for generating statistics concerning said inbound calls and said outbound calls, and for adjusting the rate of placement of said outbound calls in response to said statistics on said inbound calls and said outbound calls.

56. The apparatus of claim 55 wherein said control means comprises means for determining the average duration of said inbound calls and the average duration of said outbound calls.

57. The apparatus of claim 56 wherein said control means further comprises means for determining the delay period between the arrival of a said inbound call and the arrival of a following said inbound call and means for determining the average delay period between said inbound calls.

58. The apparatus of claim 57 wherein said control means further comprises means for determining the proportion of said outbound calls which are answered.

59. An apparatus for placing and receiving telephone calls, comprising:
 first means for detecting inbound calls;
 second means for placing outbound calls;
 third means for detecting the answering of said outbound calls;
 a plurality of agent work stations, each agent work station being associated with a corresponding agent;
 fourth means for selectably connecting said inbound calls and said outbound calls to said agent work stations; and
 fifth means for generating statistics concerning said inbound calls and said outbound calls, for causing said second means to place said outbound calls in response to said statistics, and responsive to said first means and to said third means for controlling said fourth means.

60. The apparatus of claim 59 wherein said fifth means designates a first group of a plurality of telephone trunks as inbound trunks, designates a second group of said plurality of telephone calls as outbound trunks and adjusts the rate of placement of said outbound trunks in response to the degree of usage of said first group.

61. The apparatus of claim 60 wherein said fifth means changes the number of trunks in said first group and in said second group in response to said degree of usage of said first group.

62. The apparatus of claim 61 wherein said fifth means also adjusts said rate of placement in response to the number of trunks in said second group.

63. The apparatus of claim 60 wherein said fifth means determines said degree of usage by comparing said number of unused trunks in said first group to a window value.

64. The apparatus of claim 63 wherein said fifth means decreases said number of trunks in said first group if said number of unused trunks exceeds said window value.

65. The apparatus of claim 63 wherein said fifth means increases said number of trunks in said first group if said number of unused trunks is less than said window value.

66. The apparatus of claim 59 wherein said fifth means adjusts said rate of placement by monitoring the time that a said agent is connected to a call, determining whether said call is an inbound call or an outbound call, updating statistics for said agent, predicting the time at which each said agent will become available based upon statistics for each said agent and based upon whether each said agent is handling a said inbound call or a said outbound call, and placing a next said outbound call at a time determined by the predicted time at which a said agent will become available.

67. A method for controlling trunk allocation between inbound calls and outbound calls, comprising the steps of:
 allocating a first group of a plurality of telephone trunks to said inbound calls;
 allocating a second group of said plurality of telephone trunks to said outbound calls;
 determining the degree of usage of a selected one of either said first group or said second group; and
 adjusting the size of said first group and said second group in response to said degree of usage.

68. The method of claim 67 wherein said step of determining said degree of usage comprises:
 determining the most significant inbound trunk;
 determining the most significant outbound trunk; and
 determining the number of unused trunks between said most significant inbound trunk and said most significant outbound trunk.

69. The method of claim 68 wherein said step of determining said degree of usage further comprises comparing said number of unused trunks with a window value.

70. The method of claim 69 wherein said window value is user selectable.

71. The method of claim 69 and further comprising the step of calculating said window value based upon said degree of usage.

72. The method of claim 69 wherein said step of adjusting said size of said first group and said second group comprises:
 increasing the number of said telephone trunks in said first group and decreasing the number of said telephone trunks in said second group if said number of unused trunks is less than said window value; and
 decreasing the number of said telephone trunks in said second group and increasing the number of said telephone trunks in said first group if said number of unused trunks is greater than said window value.

73. A telephone call processing system, comprising:
 first means for detecting inbound calls;
 second means for placing outbound calls by seizing selected ones of a plurality of telephone trunks and dialing telephone numbers thereon;
 third means for providing status information concerning said outbound calls by monitoring signals on said selected ones of said telephone trunks;
 a plurality of agent workstations, each said agent workstation allowing an agent to converse with a connected party and to view information concerning said connected party;
 switching means for selectably connecting ones of said telephone trunks to ones of said agent workstations; and
 control means connected to said first means, said second means, said third means, said plurality of agent workstations, and said switching means, for partitioning said plurality of trunks into a group of inbound trunks and a group of outbound trunks, for responding to said first means detecting an inbound call on an inbound trunk by causing said switch to connect said inbound trunk having said inbound call to an available agent workstation, for causing an outbound call to be placed on a said outbound trunk by sending a telephone number to said second means, for responding to said third means detecting that said outbound call has been answered by causing said switching means to connect said outbound trunk having said outbound call to an available agent workstation, monitoring the degree of usage of a selected one of either said group of said inbound trunks or said group of said outbound trunks, and repartitioning said plurality of said trunks in response to said degree of usage.

* * * * *